United States Patent
Nathan et al.

(10) Patent No.: US 9,129,328 B2
(45) Date of Patent: *Sep. 8, 2015

(54) PROCESS FOR ORDERING A SELECTION IN ADVANCE, DIGITAL SYSTEM AND JUKEBOX FOR EMBODIMENT OF THE PROCESS

(75) Inventors: Guy Nathan, Nun's Island (CA); Dominique Dion, Laval (CA); Tony Mastronardi, Pierrefonds (CA)

(73) Assignee: TouchTunes Music Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,009

(22) Filed: Aug. 24, 2012

(65) Prior Publication Data

US 2012/0330793 A1    Dec. 27, 2012

Related U.S. Application Data

(60) Continuation of application No. 12/801,744, filed on Jun. 23, 2010, now Pat. No. 8,275,668, which is a division of application No. 11/267,303, filed on Nov. 7, 2005, now Pat. No. 7,778,879, which is a division of application No. 09/585,325, filed on Jun. 2, 2000, now abandoned.

(30) Foreign Application Priority Data

Feb. 23, 2000    (FR) ...................................... 00 02252

(51) Int. Cl.
  *G06Q 30/06*    (2012.01)
  *G07F 17/16*    (2006.01)
  (Continued)

(52) U.S. Cl.
  CPC ........ *G06Q 30/0633* (2013.01); *G06Q 30/0641* (2013.01); *G07F 17/16* (2013.01); *G07F 17/305* (2013.01); *G11B 19/08* (2013.01)

(58) Field of Classification Search
  CPC ........... G06Q 30/0633; G06Q 30/0641; G06F 3/0488; G07F 17/16; G07F 17/305
  USPC .................. 705/26.1, 27.1; 725/87; 709/219; 700/94; 715/716; 434/112
  See application file for complete search history.

(56) References Cited

U.S. PATENT DOCUMENTS

| 3,710,137 A | 1/1973 | Stephens, Jr. |
| 3,807,541 A | 4/1974 | Kortenhaus |

(Continued)

FOREIGN PATENT DOCUMENTS

| AU | 199954012 | 4/2000 |
| CA | 2119184 | 9/1994 |

(Continued)

OTHER PUBLICATIONS

"Ecast Forges Landmark International Technology Partnership", Business Wire at www.findarticles.com/cf_0/m0EIN/2000_July_25/63663604/print.jhtml, 2 pages, Jul. 25, 2000.

(Continued)

*Primary Examiner* — Yogesh C Garg
(74) *Attorney, Agent, or Firm* — Nixon & Vanderhye PC

(57) ABSTRACT

This invention relates to a process for ordering a selection in advance, characterized in that it includes a step in which a menu is displayed followed by a selection in this menu, to make specific requests and particularly: a step displaying the event for which the advance order of a selection is made, and then selection of the event; a step displaying the identity of destination equipment on which the selection is to be played, and then selection of this equipment; a step displaying the date and time at which the selection is to be made on the destination equipment; a step in which particular requests are recorded and downloaded onto a file only after payment has been verified.

19 Claims, 4 Drawing Sheets

(51) Int. Cl.
*G07F 17/30* (2006.01)
*G11B 19/08* (2006.01)

(56) References Cited

U.S. PATENT DOCUMENTS

| | | |
|---|---|---|
| 3,982,620 A | 9/1976 | Kortenhaus |
| 4,008,369 A | 2/1977 | Theurer et al. |
| 4,064,362 A | 12/1977 | Williams |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,336,935 A | 6/1982 | Goldfarb |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,696,527 A | 9/1987 | Ding et al. |
| 4,703,465 A | 10/1987 | Parker |
| 4,704,725 A | 11/1987 | Harvey et al. |
| 4,704,804 A | 11/1987 | Leal |
| 4,707,804 A | 11/1987 | Leal |
| 4,722,053 A | 1/1988 | Dubno |
| 4,761,684 A | 8/1988 | Clark |
| 4,766,581 A | 8/1988 | Korn |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,815,868 A | 3/1989 | Speicher |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,965,675 A | 10/1990 | Masashi et al. |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimaru |
| 5,077,607 A | 12/1991 | Johnson et al. |
| 5,081,534 A | 1/1992 | Geiger et al. |
| 5,101,451 A | 3/1992 | Ash et al. |
| 5,101,499 A | 3/1992 | Streck et al. |
| 5,106,097 A | 4/1992 | Levine |
| 5,117,407 A | 5/1992 | Vogel |
| D327,687 S | 7/1992 | Arbiter |
| 5,128,862 A | 7/1992 | Mueller |
| 5,138,712 A | 8/1992 | Corbin |
| 5,148,159 A | 9/1992 | Clark et al. |
| 5,155,847 A | 10/1992 | Kirouac |
| 5,159,678 A | 10/1992 | Wengelski et al. |
| 5,163,131 A | 11/1992 | Row |
| 5,166,886 A | 11/1992 | Molnar |
| D332,096 S | 12/1992 | Wolff et al. |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,231,157 A | 7/1993 | Herzig et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,335,313 A | 8/1994 | Douglas |
| 5,339,095 A | 8/1994 | Redford |
| 5,339,413 A | 8/1994 | Koval |
| 5,341,350 A | 8/1994 | Frank |
| 5,355,302 A | 10/1994 | Martin et al. |
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,465,329 A | 11/1995 | Whistler |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,473,746 A | 12/1995 | Pritt et al. |

(56) References Cited

U.S. PATENT DOCUMENTS

| | | |
|---|---|---|
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,532,991 A | 7/1996 | Sasaki |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,515 A | 9/1996 | Abbruzzese et al. |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,559,714 A | 9/1996 | Banks et al. |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,590,318 A | 12/1996 | Zbikowski et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,607,099 A | 3/1997 | Yeh et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankowitz |
| 5,704,146 A | 1/1998 | Herring et al. |
| 5,708,811 A | 1/1998 | Arendt |
| 5,712,976 A | 1/1998 | Falcon |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,827 A | 2/1998 | Logan et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,748,954 A | 5/1998 | Mauldin |
| 5,751,336 A | 5/1998 | Aggarwal et al. |
| 5,752,232 A | 5/1998 | Basore et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choquier |
| 5,774,672 A | 6/1998 | Funahashi |
| 5,781,889 A | 7/1998 | Martin |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,790,935 A | 8/1998 | Payton |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,558 A | 9/1998 | Pierce |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,828,343 A | 10/1998 | MacDonald, Jr. et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,139 A | 3/1999 | Madison, Jr. et al. |
| 5,887,193 A | 3/1999 | Takahashi |
| 5,893,162 A | 4/1999 | Lau et al. |
| 5,895,455 A | 4/1999 | Bellinger et al. |

(56) References Cited

U.S. PATENT DOCUMENTS

| | | |
|---|---|---|
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Bleidt et al. |
| 5,923,885 A | 7/1999 | Johnson |
| 5,926,531 A | 7/1999 | Petite |
| 5,926,624 A | 7/1999 | Katz et al. |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,960,167 A | 9/1999 | Roberts et al. |
| 5,963,916 A | 10/1999 | Kaplan |
| 5,966,495 A | 10/1999 | Takahashi |
| 5,970,467 A | 10/1999 | Alavi |
| 5,978,855 A | 11/1999 | Metz |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,021,386 A | 2/2000 | Davis |
| 6,023,705 A | 2/2000 | Bellinger et al. |
| 6,025,868 A | 2/2000 | Russo |
| 6,026,168 A | 2/2000 | Li et al. |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,049,891 A | 4/2000 | Inamoto |
| 6,054,987 A | 4/2000 | Richardson |
| 6,055,573 A | 4/2000 | Gardenswartz et al. |
| 6,057,874 A | 5/2000 | Michaud |
| 6,067,564 A | 5/2000 | Urakoshi et al. |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,146,210 A | 11/2000 | Cha et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,167,358 A | 12/2000 | Othmer et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 | 2/2001 | Adams et al. |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,227 B1 | 4/2001 | Goldstein et al. |
| 6,219,692 B1 | 4/2001 | Stiles |
| 6,223,209 B1 | 4/2001 | Watson |
| 6,226,412 B1 | 5/2001 | Schwab |
| 6,226,715 B1 | 5/2001 | Van Der Wolf et al. |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,282,709 B1 | 8/2001 | Reha et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,301,710 B1 | 10/2001 | Fujiwara |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Owens et al. |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,353,820 B1 | 3/2002 | Edwards et al. |
| 6,356,971 B1 | 3/2002 | Katz et al. |
| 6,359,661 B1 | 3/2002 | Nickum |
| 6,370,580 B2 | 4/2002 | Kriegsman |
| 6,379,187 B2 | 4/2002 | Nishimatsu |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,080 B1 | 9/2002 | Van Ryzin et al. |
| 6,446,130 B1 | 9/2002 | Grapes |
| 6,449,688 B1 | 9/2002 | Peters et al. |
| 6,470,496 B1 | 10/2002 | Kato et al. |
| 6,473,794 B1 | 10/2002 | Guheen et al. |
| 6,488,508 B2 | 12/2002 | Okamoto |
| 6,490,570 B1 | 12/2002 | Numaoka |
| 6,493,871 B1 | 12/2002 | McGuire et al. |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| D475,029 S | 5/2003 | Nathan et al. |
| 6,560,651 B2 | 5/2003 | Katz et al. |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |

(56) References Cited

U.S. PATENT DOCUMENTS

| | | | |
|---|---|---|---|
| 6,598,230 | B1 | 7/2003 | Ballhorn |
| 6,622,307 | B1 | 9/2003 | Ho |
| 6,628,939 | B2 | 9/2003 | Paulsen |
| 6,629,318 | B1 | 9/2003 | Radha et al. |
| 6,643,620 | B1 | 11/2003 | Contolini et al. |
| 6,643,690 | B2 | 11/2003 | Duursma et al. |
| 6,654,801 | B2 | 11/2003 | Mann et al. |
| 6,658,090 | B1 | 12/2003 | Harjunen et al. |
| 6,662,231 | B1 | 12/2003 | Drosset et al. |
| 6,702,585 | B2 | 3/2004 | Okamoto |
| 6,728,824 | B1 | 4/2004 | Chen |
| 6,728,956 | B2 | 4/2004 | Ono |
| 6,728,966 | B1 | 4/2004 | Arsenault et al. |
| 6,744,882 | B1 | 6/2004 | Gupta et al. |
| 6,751,794 | B1 | 6/2004 | McCaleb et al. |
| 6,755,744 | B1 | 6/2004 | Nathan et al. |
| 6,762,585 | B2 | 7/2004 | Liao |
| D495,755 | S | 9/2004 | Wurz et al. |
| 6,789,215 | B1 | 9/2004 | Rupp et al. |
| 6,816,578 | B1 | 11/2004 | Kredo et al. |
| 6,850,252 | B1 | 2/2005 | Hoffberg |
| 6,898,161 | B1 | 5/2005 | Nathan |
| 6,904,592 | B1 | 6/2005 | Johnson |
| 6,920,614 | B1 | 7/2005 | Schindler et al. |
| 6,928,653 | B1 | 8/2005 | Ellis et al. |
| 6,934,700 | B1 | 8/2005 | Ijdens et al. |
| 6,942,574 | B1 | 9/2005 | LeMay et al. |
| 6,974,076 | B1 | 12/2005 | Siegel |
| 7,024,485 | B2 | 4/2006 | Dunning et al. |
| 7,073,172 | B2 | 7/2006 | Chamberlain |
| 7,103,583 | B1 | 9/2006 | Baum et al. |
| 7,107,109 | B1 | 9/2006 | Nathan et al. |
| 7,111,129 | B2 | 9/2006 | Percival |
| 7,114,013 | B2 | 9/2006 | Bakke et al. |
| 7,124,194 | B2 | 10/2006 | Nathan et al. |
| 7,160,132 | B2 | 1/2007 | Phillips et al. |
| 7,181,458 | B1 | 2/2007 | Higashi |
| 7,188,352 | B2 | 3/2007 | Nathan et al. |
| 7,195,157 | B2 | 3/2007 | Swartz et al. |
| 7,198,571 | B2 | 4/2007 | LeMay et al. |
| 7,206,417 | B2 | 4/2007 | Nathan |
| 7,210,141 | B1 | 4/2007 | Nathan et al. |
| 7,231,656 | B1 | 6/2007 | Nathan |
| 7,237,198 | B1 | 6/2007 | Chaney |
| 7,281,652 | B2 | 10/2007 | Foss |
| 7,293,277 | B1 | 11/2007 | Nathan |
| D560,651 | S | 1/2008 | Berkheimer et al. |
| 7,347,723 | B1 | 3/2008 | Daily |
| D566,195 | S | 4/2008 | Ichimura et al. |
| 7,356,831 | B2 | 4/2008 | Nathan |
| 7,406,529 | B2 | 7/2008 | Reed |
| 7,415,707 | B2 | 8/2008 | Taguchi et al. |
| 7,418,474 | B2 | 8/2008 | Schwab |
| 7,424,731 | B1 | 9/2008 | Nathan et al. |
| 7,430,736 | B2 | 9/2008 | Nguyen et al. |
| 7,433,832 | B1 | 10/2008 | Bezos et al. |
| 7,448,057 | B1 | 11/2008 | Nathan |
| 7,483,958 | B1 | 1/2009 | Elabbady et al. |
| 7,500,192 | B2 | 3/2009 | Mastronardi |
| 7,512,632 | B2 | 3/2009 | Mastronardi et al. |
| 7,519,442 | B2 | 4/2009 | Nathan et al. |
| 7,522,631 | B1 | 4/2009 | Brown et al. |
| 7,533,182 | B2 | 5/2009 | Wurtzel et al. |
| 7,549,919 | B1 | 6/2009 | Nathan et al. |
| 7,574,727 | B2 | 8/2009 | Nathan et al. |
| 7,634,228 | B2 * | 12/2009 | White et al. ............... 455/3.06 |
| 7,647,613 | B2 | 1/2010 | Drakoulis et al. |
| 7,657,910 | B1 | 2/2010 | McAulay et al. |
| D616,414 | S | 5/2010 | Nathan et al. |
| 7,749,083 | B2 | 7/2010 | Nathan et al. |
| 7,757,264 | B2 | 7/2010 | Nathan |
| 7,761,538 | B2 | 7/2010 | Lin et al. |
| 7,770,165 | B2 | 8/2010 | Olson et al. |
| 7,778,879 | B2 | 8/2010 | Nathan et al. |
| 7,783,593 | B2 | 8/2010 | Espino |
| 7,783,774 | B2 | 8/2010 | Nathan et al. |
| 7,793,331 | B2 | 9/2010 | Nathan et al. |
| 7,819,734 | B2 | 10/2010 | Nathan et al. |
| 7,822,687 | B2 | 10/2010 | Brillon et al. |
| D629,382 | S | 12/2010 | Nathan et al. |
| 7,937,724 | B2 | 5/2011 | Clark et al. |
| D642,553 | S | 8/2011 | Nathan et al. |
| 7,992,178 | B1 | 8/2011 | Nathan et al. |
| 7,996,873 | B1 | 8/2011 | Nathan et al. |
| 8,015,200 | B2 | 9/2011 | Seiflein et al. |
| 8,028,318 | B2 | 9/2011 | Nathan |
| 8,032,879 | B2 | 10/2011 | Nathan et al. |
| 8,037,412 | B2 | 10/2011 | Nathan et al. |
| 8,052,512 | B2 | 11/2011 | Nathan et al. |
| 8,103,589 | B2 | 1/2012 | Nathan et al. |
| 8,151,304 | B2 | 4/2012 | Nathan et al. |
| 8,165,318 | B2 | 4/2012 | Nathan et al. |
| 8,214,874 | B2 | 7/2012 | Nathan |
| D665,375 | S | 8/2012 | Garneau et al. |
| 8,292,712 | B2 | 10/2012 | Nathan et al. |
| 8,325,571 | B2 | 12/2012 | Cappello et al. |
| 8,332,895 | B2 | 12/2012 | Nathan et al. |
| 8,429,530 | B2 | 4/2013 | Neuman et al. |
| 2001/0016815 | A1 | 8/2001 | Takahashi et al. |
| 2001/0023403 | A1 | 9/2001 | Martin et al. |
| 2001/0030660 | A1 | 10/2001 | Zainoulline |
| 2001/0030912 | A1 | 10/2001 | Kalis et al. |
| 2001/0037367 | A1 | 11/2001 | Iyer |
| 2001/0044725 | A1 | 11/2001 | Matsuda et al. |
| 2002/0002079 | A1 | 1/2002 | Martin et al. |
| 2002/0002483 | A1 | 1/2002 | Siegel et al. |
| 2002/0018074 | A1 | 2/2002 | Buil et al. |
| 2002/0032603 | A1 | 3/2002 | Yeiser |
| 2002/0040371 | A1 | 4/2002 | Burgess |
| 2002/0113824 | A1 | 8/2002 | Myers |
| 2002/0116476 | A1 | 8/2002 | Eyal et al. |
| 2002/0118949 | A1 | 8/2002 | Jones et al. |
| 2002/0120925 | A1 | 8/2002 | Logan |
| 2002/0123331 | A1 | 9/2002 | Lehaff et al. |
| 2002/0126141 | A1 | 9/2002 | Mastronardi |
| 2002/0129036 | A1 | 9/2002 | Ho Yuen Lok et al. |
| 2002/0162104 | A1 | 10/2002 | Raike et al. |
| 2003/0004833 | A1 | 1/2003 | Pollak et al. |
| 2003/0005099 | A1 | 1/2003 | Sven et al. |
| 2003/0006911 | A1 | 1/2003 | Smith et al. |
| 2003/0008703 | A1 | 1/2003 | Gauselmann |
| 2003/0014272 | A1 | 1/2003 | Goulet et al. |
| 2003/0018740 | A1 | 1/2003 | Sonoda et al. |
| 2003/0027120 | A1 | 2/2003 | Jean |
| 2003/0031096 | A1 | 2/2003 | Nathan et al. |
| 2003/0037010 | A1 | 2/2003 | Schmelzer |
| 2003/0041093 | A1 | 2/2003 | Yamane et al. |
| 2003/0050058 | A1 | 3/2003 | Walsh et al. |
| 2003/0064805 | A1 | 4/2003 | Wells |
| 2003/0065639 | A1 | 4/2003 | Fiennes et al. |
| 2003/0076380 | A1 | 4/2003 | Yusef et al. |
| 2003/0088538 | A1 | 5/2003 | Ballard |
| 2003/0093790 | A1 | 5/2003 | Logan et al. |
| 2003/0101450 | A1 | 5/2003 | Davidsson et al. |
| 2003/0104865 | A1 | 6/2003 | Itkis et al. |
| 2003/0108164 | A1 | 6/2003 | Laurin et al. |
| 2003/0135424 | A1 | 7/2003 | Davis et al. |
| 2003/0144910 | A1 | 7/2003 | Flaherty et al. |
| 2003/0176218 | A1 | 9/2003 | LeMay et al. |
| 2003/0191753 | A1 | 10/2003 | Hoch |
| 2003/0208586 | A1 | 11/2003 | Mastronardi et al. |
| 2003/0225834 | A1 | 12/2003 | Lee et al. |
| 2004/0010800 | A1 | 1/2004 | Goci |
| 2004/0025185 | A1 | 2/2004 | Goci et al. |
| 2004/0085334 | A1 | 5/2004 | Reaney |
| 2004/0103150 | A1 | 5/2004 | Ogdon et al. |
| 2004/0145477 | A1 | 7/2004 | Easter et al. |
| 2004/0158555 | A1 | 8/2004 | Seedman et al. |
| 2004/0204220 | A1 | 10/2004 | Fried et al. |
| 2004/0205171 | A1 | 10/2004 | Nathan et al. |
| 2004/0220926 | A1 | 11/2004 | Lamkin et al. |
| 2004/0243482 | A1 | 12/2004 | Laut |
| 2005/0048816 | A1 | 3/2005 | Higgins |
| 2005/0060405 | A1 | 3/2005 | Nathan et al. |

(56) References Cited

U.S. PATENT DOCUMENTS

| | | |
|---|---|---|
| 2005/0073782 A1 | 4/2005 | Nathan |
| 2005/0086172 A1 | 4/2005 | Stefik |
| 2005/0111671 A1 | 5/2005 | Nathan |
| 2005/0125833 A1 | 6/2005 | Nathan et al. |
| 2005/0201254 A1 | 9/2005 | Looney et al. |
| 2005/0267819 A1 | 12/2005 | Kaplan |
| 2006/0018208 A1 | 1/2006 | Nathan et al. |
| 2006/0031896 A1 | 2/2006 | Pulitzer |
| 2006/0035707 A1 | 2/2006 | Nguyen et al. |
| 2006/0062094 A1 | 3/2006 | Nathan et al. |
| 2006/0143575 A1 | 6/2006 | Sauermann |
| 2006/0227673 A1 | 10/2006 | Yamashita et al. |
| 2006/0239131 A1 | 10/2006 | Nathan et al. |
| 2006/0247064 A1 | 11/2006 | Nguyen et al. |
| 2006/0293773 A1 | 12/2006 | Nathan et al. |
| 2007/0025701 A1 | 2/2007 | Kawasaki et al. |
| 2007/0047198 A1 | 3/2007 | Crooijmans et al. |
| 2007/0086280 A1 | 4/2007 | Cappello et al. |
| 2007/0121430 A1 | 5/2007 | Nathan |
| 2007/0139410 A1 | 6/2007 | Abe et al. |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1* | 9/2007 | Nathan ............ 725/87 |
| 2007/0220052 A1 | 9/2007 | Kudo et al. |
| 2007/0247979 A1 | 10/2007 | Brillon et al. |
| 2008/0003881 A1 | 1/2008 | Wu |
| 2008/0065925 A1 | 3/2008 | Oliverio et al. |
| 2008/0066016 A1 | 3/2008 | Dowdy et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0155588 A1 | 6/2008 | Roberts et al. |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0198271 A1 | 8/2008 | Malki |
| 2008/0222199 A1 | 9/2008 | Tiu et al. |
| 2008/0239887 A1 | 10/2008 | Tooker et al. |
| 2008/0275771 A1 | 11/2008 | Levine |
| 2008/0305738 A1 | 12/2008 | Khedouri et al. |
| 2009/0030802 A1 | 1/2009 | Plotnick et al. |
| 2009/0037969 A1 | 2/2009 | Nathan et al. |
| 2009/0042632 A1 | 2/2009 | Guenster et al. |
| 2009/0063976 A1 | 3/2009 | Bull et al. |
| 2009/0070341 A1 | 3/2009 | Mastronardi et al. |
| 2009/0091087 A1 | 4/2009 | Wasmund |
| 2009/0100092 A1 | 4/2009 | Seiflein et al. |
| 2009/0138111 A1 | 5/2009 | Mastronardi |
| 2009/0168901 A1 | 7/2009 | Yarmolich et al. |
| 2009/0172565 A1 | 7/2009 | Jackson et al. |
| 2009/0177301 A1 | 7/2009 | Hayes |
| 2009/0240721 A1 | 9/2009 | Giacalone |
| 2009/0241061 A1 | 9/2009 | Asai et al. |
| 2009/0265734 A1 | 10/2009 | Dion et al. |
| 2009/0282491 A1 | 11/2009 | Nathan |
| 2009/0287696 A1 | 11/2009 | Galuten |
| 2009/0298577 A1 | 12/2009 | Gagner et al. |
| 2009/0307314 A1 | 12/2009 | Smith et al. |
| 2009/0328095 A1 | 12/2009 | Vinokurov et al. |
| 2010/0042505 A1 | 2/2010 | Straus |
| 2010/0131558 A1 | 5/2010 | Logan et al. |
| 2010/0211818 A1 | 8/2010 | Nathan et al. |
| 2010/0241259 A1 | 9/2010 | Nathan |
| 2010/0247081 A1 | 9/2010 | Pons |
| 2010/0269066 A1 | 10/2010 | Nathan et al. |
| 2010/0299232 A1 | 11/2010 | Nathan et al. |
| 2010/0306179 A1 | 12/2010 | Lim |
| 2011/0055019 A1 | 3/2011 | Coleman |
| 2011/0066943 A1 | 3/2011 | Brillon et al. |
| 2011/0173521 A1 | 7/2011 | Horton et al. |
| 2011/0270894 A1 | 11/2011 | Mastronardi et al. |
| 2011/0283236 A1 | 11/2011 | Beaumier et al. |
| 2011/0298938 A1 | 12/2011 | Nathan et al. |
| 2011/0304685 A1 | 12/2011 | Khedouri et al. |
| 2011/0321026 A1 | 12/2011 | Nathan et al. |
| 2012/0009985 A1 | 1/2012 | Nathan et al. |
| 2012/0053713 A1 | 3/2012 | Nathan |
| 2012/0105464 A1 | 5/2012 | Franceus |
| 2012/0143732 A1 | 6/2012 | Nathan et al. |
| 2012/0150614 A1 | 6/2012 | Dion et al. |
| 2012/0158531 A1 | 6/2012 | Dion et al. |
| 2012/0166965 A1 | 6/2012 | Nathan et al. |
| 2012/0240140 A1 | 9/2012 | Nathan |
| 2012/0323652 A1 | 12/2012 | Mastronardi et al. |
| 2013/0021281 A1 | 1/2013 | Tse et al. |
| 2013/0040715 A1 | 2/2013 | Nathan et al. |
| 2013/0044995 A1 | 2/2013 | Cappello et al. |
| 2013/0070093 A1 | 3/2013 | Rivera et al. |
| 2013/0091054 A1 | 4/2013 | Nathan et al. |
| 2014/0026154 A1 | 1/2014 | Nathan |

FOREIGN PATENT DOCUMENTS

| | | |
|---|---|---|
| CN | 1340939 | 3/2002 |
| DE | 3406058 | 8/1985 |
| DE | 3723737 A1 | 1/1988 |
| DE | 3820835 A1 | 1/1989 |
| DE | A 3820835 | 1/1989 |
| DE | 3815071 | 11/1989 |
| DE | 4244198 | 6/1994 |
| DE | 19539172 | 9/1996 |
| DE | 19610739 | 9/1997 |
| DE | 19904007 | 8/2000 |
| EP | A0082077 | 6/1983 |
| EP | 0140593 A2 | 5/1985 |
| EP | 0256921 | 2/1988 |
| EP | 0283304 | 9/1988 |
| EP | A 0283350 | 9/1988 |
| EP | 0309298 | 3/1989 |
| EP | A 0313359 | 4/1989 |
| EP | 0340787 | 11/1989 |
| EP | 0363186 | 4/1990 |
| EP | 0 425 168 A | 5/1991 |
| EP | 0464562 A2 | 1/1992 |
| EP | 0480558 | 4/1992 |
| EP | 0498130 | 8/1992 |
| EP | 0498130 A2 | 8/1992 |
| EP | 0 507 110 | 10/1992 |
| EP | 0529834 | 3/1993 |
| EP | 0538319 B1 | 4/1993 |
| EP | A 0631283 | 12/1994 |
| EP | 0632371 | 1/1995 |
| EP | 0711076 | 5/1996 |
| EP | 0786122 B1 | 7/1997 |
| EP | 0817103 | 1/1998 |
| EP | 0841616 A2 | 5/1998 |
| EP | 0919964 | 6/1999 |
| EP | 0959570 A1 | 11/1999 |
| EP | 0 974896 A1 | 1/2000 |
| EP | 0974941 | 1/2000 |
| EP | 0982695 | 3/2000 |
| EP | 1001391 | 5/2000 |
| EP | 1170951 | 1/2002 |
| EP | 1288802 | 3/2003 |
| EP | 1408427 | 4/2004 |
| EP | 1549919 | 4/2004 |
| EP | 1962251 | 8/2008 |
| FR | A 2602352 | 2/1988 |
| FR | 2808906 | 11/2001 |
| GB | A 2122799 | 1/1984 |
| GB | 2166328 A | 4/1986 |
| GB | 2170943 | 8/1986 |
| GB | 2193420 | 2/1988 |
| GB | 2 238680 A | 6/1991 |
| GB | 2254469 | 10/1992 |
| GB | 2259398 | 3/1993 |
| GB | 2262170 A | 6/1993 |
| GB | 2380377 | 4/2003 |
| GB | 2505584 | 8/2014 |
| JP | 57-173207 | 10/1982 |
| JP | 58-179892 | 10/1983 |

(56) References Cited

FOREIGN PATENT DOCUMENTS

| | | |
|---|---|---|
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | 06-127885 | 5/1994 |
| JP | 07281682 | 10/1995 |
| JP | 07-311587 | 11/1995 |
| JP | 08-037701 | 2/1996 |
| JP | 08-279235 | 10/1996 |
| JP | 8274812 | 10/1996 |
| JP | 08289976 | 11/1996 |
| JP | 928918 | 2/1997 |
| JP | 2002-537584 | 5/1997 |
| JP | 9127964 | 5/1997 |
| JP | 09-244900 | 9/1997 |
| JP | 10-098344 | 4/1998 |
| JP | 10-222537 | 8/1998 |
| JP | 11-00308 | 1/1999 |
| JP | 11-024686 | 1/1999 |
| JP | 11-095768 | 4/1999 |
| JP | 2002-83640 | 3/2002 |
| JP | 2003-084903 | 11/2002 |
| JP | 2003-076380 | 3/2003 |
| JP | 2003-099072 | 4/2003 |
| JP | 2005-107267 | 4/2005 |
| JP | 2005-184237 | 7/2005 |
| JP | 2006-048076 | 2/2006 |
| JP | 2007-034253 | 2/2007 |
| JP | 2007-041722 | 2/2007 |
| JP | 2007-102982 | 2/2007 |
| JP | 2007/505410 | 3/2007 |
| JP | 2007-104072 | 4/2007 |
| JP | 2007-128609 | 5/2007 |
| JP | 2007-164078 | 6/2007 |
| JP | 2007-164298 | 6/2007 |
| JP | 2007/179333 | 7/2007 |
| JP | 2007-241748 | 9/2007 |
| JP | 2008-058656 | 3/2008 |
| JP | 2009-017529 | 1/2009 |
| JP | 07504517 | 1/2009 |
| TW | 514511 | 12/2002 |
| TW | M274284 | 9/2005 |
| TW | M290206 | 5/2006 |
| WO | WO 86 01326 A1 | 2/1986 |
| WO | WO 90/00429 | 1/1990 |
| WO | WO A 90 07843 | 7/1990 |
| WO | WO 91/08542 | 6/1991 |
| WO | WO A 91 20082 | 12/1991 |
| WO | WO 93/16557 | 8/1993 |
| WO | WO A 93 18465 | 9/1993 |
| WO | WO93/021732 | 10/1993 |
| WO | WO A 94 03894 | 2/1994 |
| WO | WO 94/14273 | 6/1994 |
| WO | WO 94/15306 | 7/1994 |
| WO | WO 94 15416 A | 7/1994 |
| WO | WO 95 03609 A | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96 12258 A | 4/1996 |
| WO | WO 98/07940 | 2/1998 |
| WO | WO 98/11487 | 3/1998 |
| WO | WO 98/45835 | 10/1998 |
| WO | WO 99/35753 | 7/1999 |
| WO | WO 01/00290 | 1/2001 |
| WO | WO 01/08148 | 2/2001 |
| WO | WO 01/71608 | 9/2001 |
| WO | WO 01/084353 | 11/2001 |
| WO | WO 02/060546 | 8/2002 |
| WO | WO 02/095752 | 11/2002 |
| WO | WO 03/005743 | 1/2003 |
| WO | WO 03/063613 | 8/2003 |
| WO | WO 2004/029775 | 4/2004 |
| WO | WO 2005/026916 | 3/2005 |
| WO | WO 2006/014739 | 2/2006 |
| WO | WO 2006/056933 | 6/2006 |
| WO | WO 2006/138064 | 12/2006 |
| WO | WO 2007/092542 | 8/2007 |
| WO | WO 2008-033853 | 3/2008 |
| WO | WO 2011094330 | 8/2011 |
| WO | WO 2013/040603 | 3/2013 |

OTHER PUBLICATIONS

"Ecast Selects Viant to Build Siren Entertainment System (TM)", ScreamingMedia, PR Newswire San Francisco, industry.java.sum.com/javanews/stories/story2/0,1072.17618,00.html, 3 pages, Aug. 3, 1999.
Derfler et al., "How Networks Work", Millennium Ed., Que Corporation, Jan. 2000.
European Search Report from EP 1 993 079.
European Search Report issued for European Application No. 08000845.1-1238/1962251, dated Apr. 3, 2009.
Gralla, "How the Internet Works", Millennium Ed., Que Corporation, Aug. 1999.
Hicks et al., "Dynamic software updating", ACM PLDI, pp. 13-23, 2001.
iTouch 27 New Games brochure, JVL Corporation, 2005. 2 pages.
iTouch 8 Plus brochure, JVL Corporation, 2005, 2 pages.
Kozierok, The PC Guide, Site Version 2.2.0, http://www.pcguide.com, Apr. 17, 2001.
Liang et al., "Dynamic class loading in the Java virtual machine", ACM OOPSLA, pp. 36-44, 1998.
Look and iTouch brochure, JVL Corporation, 2004, 2 pages.
Megatouch Champ brochure, Merit Industries, Inc., 2005, 2 pages.
Melnik et al., "A mediation infrastructure for digital library services", ACM DL, pp. 123-132, 2000.
Mod Box Internet brochure, Merit Entertainment, 2006, 2 pages.
Newsome et al., "Proxy compilation of dynamically loaded java classes with MoJo", ACM LCTES, pp. 204-212, 2002.
Schneier, "Applied Cryptography", Second Edition, John Wiley & Sons, Inc. New York, 1996.
Vortex Brochure, JVL Corporation, 2005, 2 pages.
Waingrow, "Unix Hints & Hacks", Que Corporation, Indianapolis, IN, 1999.
Press Release, "MusicMatch Announces Commerical Availability of Meta Trust Certified MusicMatch jukebox", PR Newswire, New York; Nov. 15, 1999, extracted from Internet, http://proquest.umi.com on Sep. 17, 2002.
White, "How Computers Work", Millennium Ed., Que Corporation, Indianapolis, IN, Sep. 1999 (Sep. 22, 1999).
Patent Abstract of Japan vol. 95, No. 010 & JP 07 281682 A (Naguo Yuasa), 27 Oct. 1 JP 07 281682, figure 1-6 abrége.
Bonczck, Robert H. et al, "The DSS Development System", 1983 National Computer Conference, Anaheim, California, May 16-19, 1983, pp. 441-455.
"High-speed Opens and Shorts Substrate Tester", IBM Technical Disclosure Bulletin, vol. 33, No. 12, May 1991, pp. 251-259.
"Darts Revolution Again", Replay Magazine, Mar. 1991, pp. 146-148.
"Robotic Wafer Handling System for Class 10 Environments" IBM Technical Disclosure Bulletin, vol. 32, No. 9A, Feb. 1990, pp. 141-143.
Galen A. Grimes, "Chapter 18, Taking Advantage or Web-based Audio."
Petri Koskelainem "Report on Streamworks™".
W. Richard Stevens, "TCP/IP Illustrated: vol. 1, the Protocols".
Nowell Outlaw "Virtual Servers Offer Performance benefits for Networks Imaging".
IBM Technical Disclosure Bulletin, vol. 30, No. 5, Oct. 1987, "Method for Automated Assembly of Software Versions", pp. 353-355.
Ahanger et al; A Digital On-Demand Video Service Supporting Content-Based Queries; 1993; 9 pages.

(56) References Cited

OTHER PUBLICATIONS

Chan et al., "Distributed servers architectures for networked video services", IEEE Trans on Networking, vol. 9, No. 2, pp. 125-136, 2001.
Chen et al., "Optimization of the grouped sweeping scheduling (GSS) with heterogenous multimedia streams", ACM Multimedia, pp. 1-7, 1993.
Crutcher et al., "The networked video Jukebox", IEEE Trans. on circuits and systems for video technology, vol. 4, No. 2, pp. 105-120, 1994.
Drews, C.; Pestoni, F.; "Virtual jukebox: reviewing a classic," Proceedings of the 35th Annual Hawaii International Conference System Sciences, pp. 887-893, Jan. 7-10, 2002.
"Foobar 2000 Evaluation Updated," MonkeyBiz, Aug. 3, 2008, 4 pages (with partial English translation), http://www.monkeybizinfo.blogspot.jp/2008/08/foobar2000.html.
Gallardo et al., "Tangible Jukebox: back to palpable music", ACM TEI, pp. 199-202, 2010.
Hewlett-Packard Development Co; HP Open View Storage Data Protector Admin's Guideline Manual Edition; May 2003; Copyright 2003; 60 pages http://h20000.www2.hp.com/bc/docs/support/SupportManual/c006637931/c00663793.pdf.
IBM Technical Disclosure Bulletin, vol. 41, No. 1, Jan. 1998, "Safe Mechanism for Installing Operating System Updates with Applications," pp. 557-559.
Kraiss et al., "Integrated document caching and prefetching in storage hierarchies based on Markov chain predictions", The VLDB Journal, vol. 7, Issue 3, pp. 141-162, 1998.
Ludescher et al., "File Storage Management for TFTF physics data", IEEE, pp. 856-859, 1992.
Merriam Webster's Collegiate Dictionary, Ninth Edition, Merriam Webster, Inc., p. 1148, 1986 (definition of "Stand").
Merriam Webster's Collegiate Dictionary, Tenth Edition, Merriam Webster, Inc., p. 361, (definition of dynamically).
Peter Pawlowski, "Basic Player Whose Appearance and Functions can be Customized Freely 'Foobar 2000' v1.0 is Unveiled," Windows Forest, Japan, Jan. 12, 2010, 3 pages (with partial English translation), http://forest.impress.co.jp/docs/news/20100112_341870.html.
Pohlmann, "Principles of Digital Audio", Third Edition, 1995.
Rollins et al., "Pixie: A jukebox architecture to support efficient peer content exchange", ACM Multimedia, pp. 179-188, 2002.
Sprague et al., "Music selection using the partyvote democratic Jukebox", ACM AVI, pp. 433-436, 2008.
Strauss et al., "Information Jukebox A semi public device for presenting multimedia information content", Pers. Ubiquit Comput, 7, pp. 217-220, 2003.
"About Ecast" leaflet, at least as early as Nov. 8, 2013, 2 pages.
Austin Cyber Limits: Name That Tune [online], [retrieved Jul. 23, 2001], Retrieved from the Internet, 6 pages, <http://www.pbs.ork.klru/austin/games/namethattune.html>.
Back to the Tunes [online], [retrieved Jul. 23, 2001], Retrieved from the Internet, 1 page. <http://cite5.hispeed.com/rules.html>.
Fachbuch, "Unterhaltungselektronic von A-Z" gfu 1, VDE-Verlag GmbH, pp. 12-13, 1 page, 1983-1984.
Johnny Rockets Name That Tune [online], [retrieved on Mar. 7, 2002], Retrieved from the Internet, 3 pages. <http://www.johnnyrockets.com/docs/funstuff.html>.
Mickey B's Jukebox Revue—Name That Tune![online], [retrieved Jul. 23, 2001], Retrieved from the Internet, 2 pages, <http://mickeyb.com/tune/>.
Stewart "Ecast Deploys Marimba's Castanet to Power an Internet-Based, Entertainment Management Systems for the Out-of-Home Market", Marimba, Press Release, 3 pages, Dec. 13, 1999. www.marimba.com/news/releases/ecase.dec13.html.
Tom & Liz 's Name That Tune [online], [retrieved Jul. 23, 2001], Retrieved from the Internet, 10 pages. <http://home.att.net/~tomnliz/Music.html>.

\* cited by examiner

PROCESS FOR ORDERING A SELECTION IN ADVANCE, DIGITAL SYSTEM AND JUKEBOX FOR EMBODIMENT OF THE PROCESS

CROSS-REFERENCES TO RELATED APPLICATIONS

This application is a continuation of application Ser. No. 12/801,744 filed Jun. 23, 2010 now U.S. Pat. No. 8,275,668, which is a divisional of application Ser. No. 11/267,303 filed Nov. 7, 2005 now U.S. Pat. No. 7,778,879, which is a divisional of application Ser. No. 09/585,325 filed Jun. 2, 2000 now abandoned, which claims priority to French Patent Application No. 00 02252 filed Feb. 23, 2000, the entire contents of which are hereby incorporated by reference in this application.

FIELD OF THE INVENTION

This invention relates to a process for ordering a selection in advance, and the digital system and jukebox for embodiment of the process.

BACKGROUND OF THE INVENTION

French patent application 98 09358 deposited on Jul. 22, 1998 describes a specific function of a jukebox and a network connecting a set of jukeboxes to a server in order to distribute the title song of a new album of a singer on a given date defined as the distribution and marketing date of the song, onto all reproduction systems. However, with this type of system, a particular jukebox user or a user connected to the host server through the Internet supervising a number of jukeboxes is unable to select a song and order it so that the song can be played on a given date on a given jukebox or on several given jukeboxes.

BRIEF SUMMARY OF THE INVENTION

The first purpose of this invention is to overcome this disadvantage of prior art by proposing a process for ordering a selection in advance.

This purpose is achieved by a process for ordering a selection in advance, characterized in that it includes a step in which a menu is displayed followed by a selection in this menu, to make specific requests and particularly:

a step displaying the event for which the advance order of a selection is made, and then selection of the event;

a step displaying the identity of destination equipment on which the selection is to be made, and then selection of this equipment;

a step displaying the date and time at which the selection shall be made on the destination equipment;

a step in which particular requests are recorded and downloaded onto a file only after payment has been verified.

Another purpose is to propose a digital jukebox capable of embodying the process for advance order of a selection.

This purpose is achieved using a device for an advance order of a selection characterized in that the jukebox d or the server d comprise means of displaying information on a screen close to the user to guide him in making specific requests;

means of saving these requests in a specific file;

means of periodically examining the file saved on the equipment to trigger execution of the request at the given date and time, or to trigger its downloading.

Finally, the last purpose is to propose a digital system forming a remote distribution network for audiovisual data for embodiment of the process.

This purpose is achieved by a digital system forming a remote distribution network, characterized in that the remote distribution network comprises a host server connected firstly to the Internet network, and secondly to a set of jukeboxes through a second network, each jukebox being identified by an identity number or an address that can be used to load each specific request on the destination jukebox and means of scanning the file containing specific requests on each jukebox to have them executed when the local time and the day correspond to the selected time and day.

BRIEF DESCRIPTION OF THE DRAWINGS

Other features and advantages of this invention will become clearer after reading the following description with reference to the attached drawings in which.

DETAILED DESCRIPTION OF THE INVENTION

Figure 1:
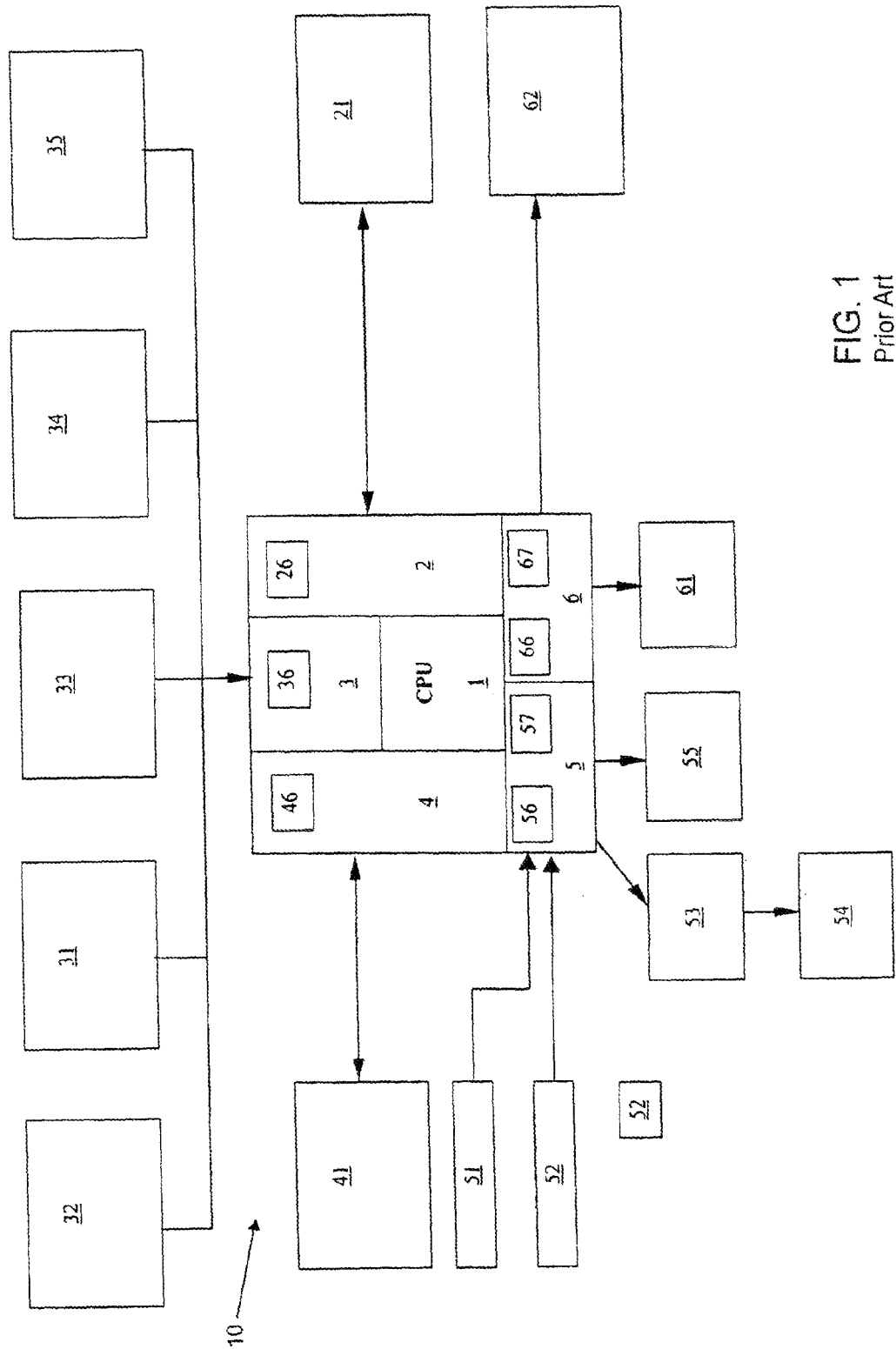
FIG. 1 represents a diagrammatic view of the electrical scheme of the equipment forming the invention.

Preferably, but non-restrictively, the audiovisual reproduction system (jukebox) 10 uses the equipment elements listed and referenced below.

The system unit 1 with a microprocessor is a high performance PC compatible system, the choice at the time of implementation was made for a Pentium type system with memory means and for example the following characteristics:

compatibility with the Vesa local bus,
processor cache memory: 256 kbytes minimum,
RAM memory: 32 Mbytes,
high performance serial ports,
microprocessor controlled SVGA type graphic adapter,
SCSI/2 type bus controller,
self-powered static RAM memory.

Any other system unit with equivalent or better performances could be used in the invention.

This system unit controls and manages a sound control circuit 5, a telecommunications control circuit 4, an input control circuit 3, a mass memory control circuit 2, and a display means control circuit 6. The display means are composed primarily of a SVGA type flat screen, high resolution, low radiation video monitor 62 with no interlacing. This is the monitor that will be used for image reproduction (for example album covers for musical selections), and to display graphics and video clips.

The mass memory means 21, for example using high speed high capacity SCSI type hard disks, are associated with the memory means already installed in the microprocessor controlled device. These means are used for the storage of digitized, compressed and possibly encrypted audiovisual information.

A high speed telecommunications modem adapter 41 is included to create the link with an audiovisual information distribution network controlled by a host server.

For the reproduction of audio information in musical selections, the system comprises loudspeakers 54 into which the signal from an amplifier tuner 53 connected to the electronic circuit 5 containing two memory buffers 56, 57 is input, the amplifier tuner being of the digital signal processor (DSP) type of music synthesizer designed to support a large number of input sources while providing an output with decrypted and decompressed digital signals with a CD (compact disk) or 1-Hifi type quality.

Similarly, the display means control circuit also comprises two memory buffers 66, 67, the purpose of which is described later.

A 240 watt ventilated power supply with temperature regulation supplies energy to the system. This power supply is protected against overcurrents and overoscillations.

The audiovisual reproduction system manages a touchscreen 33 that includes a glass coating panel based on the "advanced surface wave technology" and an AT type bus controller, through its input controller circuit 3. This touchscreen displays various selection information for use by customers, and control and management checking information for use by the manager, on the video monitor 62 or television screen 61, and the system owner then uses it to make a selection. It is also used for maintenance purposes in combination with an external keyboard 34 that may be connected to the system and that is provided with a keyboard connector controlled by a key lock 32 through the interface circuit 3.

The input circuit 3 also forms the interface between the system and a remote control assembly 31, for example composed of a radio frequency RF remote control.

A fee payment device 35 is also connected to the input interface circuit 3. Another device may be used capable of collecting any means of payment by coins, notes, tokens, magnetic cards or smart cards or any combination of these means of payment.

The system is designed to be fitted in a frame or rack that is provided, together with customizable external finishings.

Apart from these elements, a cordless microphone 55 is connected to the sound controller 5 that can transform the jukebox into a powerful public announcement and information system, or possibly a karaoke machine. Similarly, a cordless loudspeakers system may be used by the system to broadcast songs into other rooms.

The manager can use the remote control assembly 31, for example from behind the bar, to access and control different controls such as:
 the microphone on/off switch,
 the loudspeaker mute control,
 the sound volume control,
 the control to cancel the musical selection currently being played.

Two buffers 56, 57 are associated with the sound controller circuit 5 so that each can alternately memorize information corresponding to about at least a quarter of a second of sound. Similarly, two buffers 66, 67 are associated with the video controller circuit 6, each capable of alternately memorizing about at least a tenth of a second of image. Finally, one buffer 46 is associated with the communication controller circuit 4, another 36 with the input interface 3 and another 26 with the memory interface 2.

The operating software in the system was generated around a library of tools and services specifically designed for the audiovisual field in a multimedia universe. This library advantageously includes a high performance multi-task operating system that efficiently enables simultaneous execution of multiple code fragments. This operating software enables concurrent and orderly execution, thus avoiding any conflict between operations carried out on display means, audio reproduction means and management of telecommunication links through the distribution network. Furthermore, this software is extremely flexible.

The operating system is shared into modules comprising a first starter module 7 itself sub-divided into a first main program module 70 "JUK. EXE" that verifies the memory and verifies if the minimum number of objects necessary to enable operation of the jukebox is present; a second module 71 dynamically linked to it and dependent on it consists of the "JUKECORE. DLL" module. The function of this second module 71 is to contain C language libraries and to perform the main task.

The architecture of the operating system comprises a distribution of the different tasks into software modules connected to each other by dynamic links or composed of executable subprograms presenting main dependence links with other parts of the operating system. Each of the modules is composed of object files or dynamic link libraries organized according to a plurality of dependence levels described in the attributes. The attributes of an object or a library indicate the version number and dependences of the object file or the library with respect to other object files as described below for the PARSER. DJL module. Each attribute indicates the level assigned to the module. Thus, the JUK.EXE 70 module is at a higher level than the JUKECORE. DLL 71, TLS. DLL 72, CRDE. DLL 73, GFX. DLL 74, WDLL. DLL 75, JEEP. DLL 9 and TELECOM. DLL 10 modules, but the TELECOM. DLL 10 module depends on the JEEP. DLL module 9 (see link 910) and it is therefore at a lower level than JEEP. DLL 9.

Similarly, the level of JEEP. DLL 9 (see link 759) is lower than the level of the WDLL. DLL module 75 since it is dependent on it and TLS (link 725) is at a higher level than WDLL 75. On the other hand, TLS. DLL and GFX. DLL modules may be at the same level. The main task comprises a module (JUKECORE. DLL) designed to initialize or load the module 73, the program core "CRDE. DLL", initialize or load the graphic management module (GFX. DLL) 74, initialize or load the library loading module (WDLL. DLL) 75, load the telecommunication tasks Telecom module (DLL) 10, load the TLS. DLL module 72 that contains all usages necessary for the jukebox, for telecom, time, decryption, etc., initialize or load the library of JEEP. DLL (Juke Execution Exchange Protocol) programs performing integrity server and loading request tasks and the dialog with the, server, and starting the program module 80, SILOAD. DLL as the main task. The main jukebox application task comprises the module (SILOAD. DLL) containing the loader program library designed to verify the required dynamic links library versions in the library loading module (WDLL. DLL), to load them or call the telecommunication tasks module to perform the file transfer. The WDLL. DLL module comprises the list of the minimum versions necessary for operation in a DLL. DEFAULT file, and the list of all functions represented either by libraries with a DLL, DJL suffix, or by object files with a DJO suffix. Each object or library contains the list of all functions that the library or the object needs, and version numbers and dependences. The WDLL. DLL library loading module manages all new modules, controls inter-dependences and checks that downloaded modules do not have any other dependences and have been loaded with the necessary versions. The application part 8 specific to a jukebox comprises a number of modules loaded and run by the SILOAD. DLL module and defining the following display windows:
 a mouse signal or touch-screen signal processing module 81, called MOUSE. DJL, a module 82 for the processing of messages exchanged between objects and various other modules, called WMESSAGE. DJL, a disk files management module 83, called FIL. DJL a disk files read-write module 84, called FILIO. DJL a module JSTRUCT. DJL 85 for supervision of all events generated by equipment such as the touch-screen, the sound card, the coin collection equipment processing interface.

The SILOADL. DLL module manages loading of modules specific to the terminal task, namely all previously enumerated DJL modules and jukebox library modules 87 built up using WOBJECT. DJL 870 that manages the objects such as the mixer, purchases; the WCURSOR. DJL module 871 that manages cursor movements; the DBMAPI. DJL module 872 that manages the database; the WFONTS. DJL module 873 that manages all font types; the PARSER. DJL module 874 (syntax analysis program) that analyzes and generates screens starting from the script that creates a configuration file WIN. DEF and verifies the grammar using the "GRAMMAR. DJL" module 876 and the "LEXY. DJL" module 875 that is the lexical word functions assignment module inside the language. The PARSER. DJL module 874 contains the following information in its file header:

```
char*parser_version_info=DLL_INFO DJL;"
    DLL-NAME PARSER. DJL;"
    "VERSION 1;"
    "CREATOR KENDALF;"
    "REQUIRIES lexyy. djl;4;"
    "REQUIRIES grammar- . djl;5";
```

All modules and all libraries (DJO, DLL, DJL) contain information similar to the information in the PARSER. DJL module and this information determines version and dependence needs.

Figure 2:
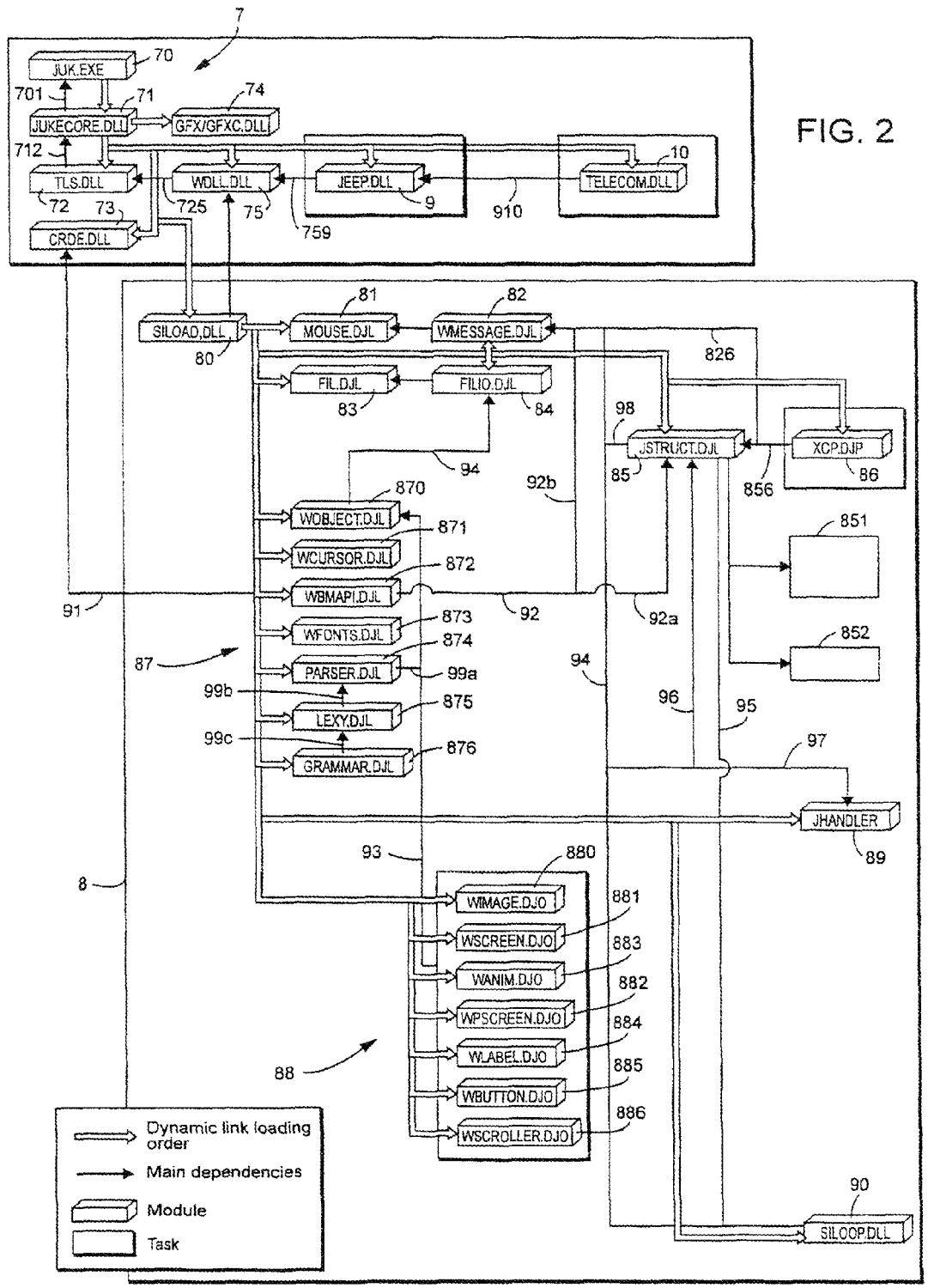
FIG. 2 represents a logic diagram showing relations between modules of libraries and object modules imported on the jukebox.

Thus, the PARSER. DJL module needs LEXY. DJL version 4 and GRAMMAR version 5 modules otherwise it cannot be executed by the system. The double arrows between the different modules in FIG. 2 show the order of loading the different files.

Thus, as seen above, the first step is to load JUKE. EXE followed by JUKECORE. DLL, so that GFX. DLL, TLS. DLL, WDLL. DLL, JEEP. DLL, TELECOM. DLL, CRDE. DLL and SILOAD. DLL can be loaded from JUKECORE. DLL.

A set of modules 88 contains the list of files that are to be included to manage the windows of a window display on the jukebox type terminal monitor.

This list of objects is composed of:

a "WPSCREEN. DJO" objects file 883 that defines the main page on the monitor, a "WSCREEN. DJO" objects file 881 that is used to determine the number of screens available and thus displays several windows or screens on this main page, a 'WIMAGE. DJO" objects file 880 that determines and defines the image that it will use in the screen, a "WANIM. DJO" objects file 882 that defines the animation when the image is animated, a "WBUTTON.DJO" objects file 885 that defines and manages buttons that are used on the main page screen such as the control buttons used in a typical graphic interface, a "WLABEL. DJO" objects file 884 that creates labels used to write on an object; and a "WSCROLLER. DJO" objects file 886 that defines vertically scrolling display areas.

The WIN. DEF configuration file calls one or more of the *. DJO files mentioned above depending on needs.

A "JHANDLER" library is used to define fixed usages of screens and therefore to determine which interfaces provide the link with the different objects defined by the previous modules.

Library module "XCP. DJL" 86 is used to manage payment tasks such as bank note reception systems or coin or smart card payment devices, and also to save basic information in the IBUTTON which is an integrated circuit for the storage of secret codes for the jukebox manager, and that can be used for example to decrypt encrypted files or songs.

Figure 3:
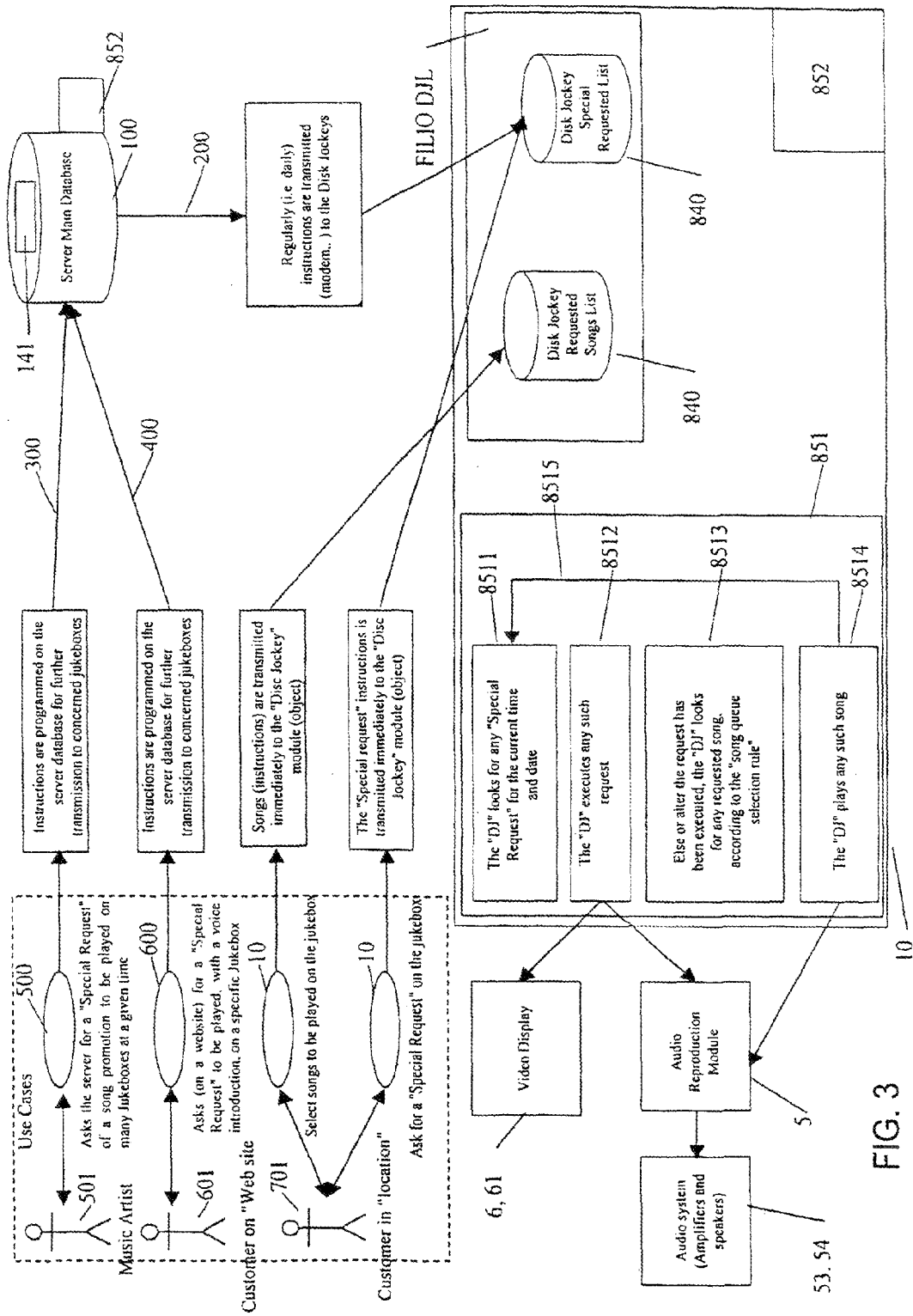
FIG. 3 diagrammatically represents the different interactions between a user, the jukebox and a server connected to the jukebox through a distribution network.
Figure 4:
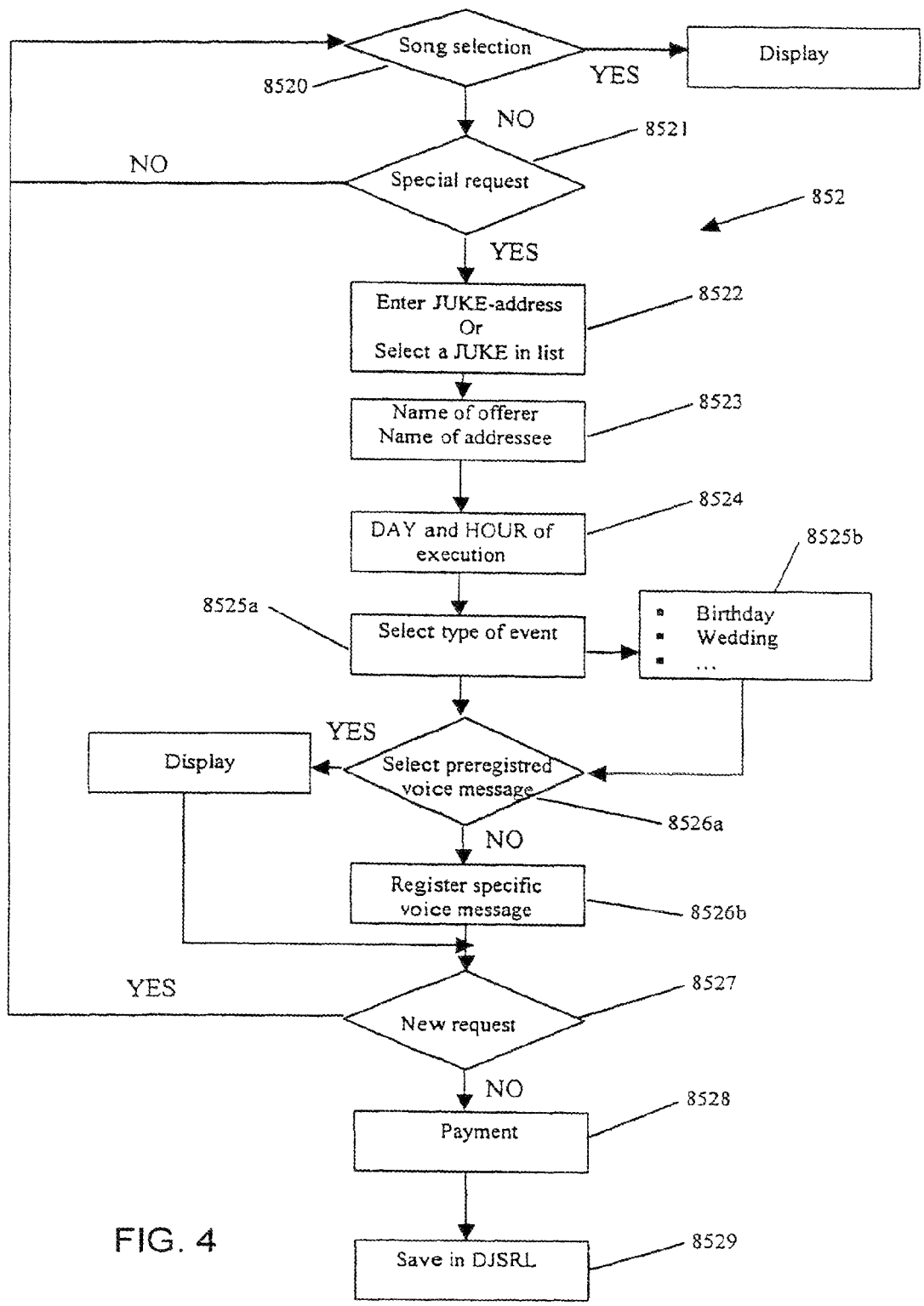
FIG. 4 represents the different steps of the process used by the devices according to the invention.

The JSTRUCT.DJL module 85 will run module 851 called the "disc-jockey" the function of which will be described below in relation to FIG. 3, when an event occurs corresponding to the end of song selection. Depending on the detected event, the same JSTRUCT.DJL module may start the request processing module 852, the function of which will be described below in relation with FIG. 4. This same request processing module 852 is also installed on the host server 100 (FIG. 3) to allow a user 601 connected to the server through a terminal 600 and the Internet network 400 to order a selection in advance. A music artist 501 can also use a terminal 500 connected to the server 100 through the Internet network 300 to make a special request for promotion of a song to be executed on several jukeboxes at a given time of a given day. Finally, a user 701 in a room equipped with one or several jukeboxes can make a selection of songs or special requests for advance orders of a selection or a special event, himself or on the jukebox 10. Song selection requests are loaded into the songs queue 840, and advance orders of a selection or a special event requests are loaded into a file 841 containing special requests and all information necessary to process these special requests. The server 100 will also include a file 141 storing these special requests until the time that the server makes a transmission to the specific jukebox or the set of specific jukeboxes to which one or several requests are applicable. This transmission is made through a network 200, for example a telecommunications network. The disc-jockey module 851 executes a first step 8511 in which it looks in the jukebox file 841 to find any special requests for the current time and the current date. If it finds any, the disc-jockey executes this request at step 8512 and starts reproduction of the selection ordered in advance and the individual message, if any. At the end of this operation, the disc-jockey checks, in step 8513, to see if there are any songs ordered in advance, or goes onto the next song stored in the queue in the file 840. In step 8514, the disc-jockey starts execution of this song. The disc-jockey then loops back 8515 to the first step 8511. The special requests processing program module 852 comprises means of producing a display as shown in FIG. 4 asking the user in front of the jukebox or a terminal connected to the Internet, in step 8521, if he would like to select a song in step 8520, or if he would like to make a special request. If he would like to make a special request, the program will use the object modules described above to display windows in which the user can define the jukebox address in step 8522, or select this address in a list downloaded by the server. The user will thus define either the jukebox for which he knows the address, or the jukebox that he selects in the list closest to the person to whom he wishes to offer the selection in his advance order. In the next step, 8523, the program displays screens that the user can use to enter the name of the person sending the song and the name of the person receiving it. In step 8524, the program displays windows in which the date and time at which the selection will be executed can be defined.

Once this definition has been made, the program goes on to step 8525*a* in which the user selects the event type that he wishes to celebrate. In this case, the program will display a list of events 8525*b* defining events such as birthdays, marriage, engagements, etc. The user moves the cursor to one of these events either by action on the touch-screen or by using a keyboard or a mouse, and validates this selection. Once the selection has been validated, the program goes on to the next step 8526*a* in which it displays a message asking the user if he would like to offer this selection with a prerecorded voice message. If so, the program displays windows that guide the user in selecting a prerecorded voice message. If not, the program goes on to the next step 8526*b* in which the user can make a special voice recording and store the recording with the data making up the file for this special request for an advance order. In step 8527, the program displays a screen asking the user if he would like to make a new request, and if so it loops back to the first step 8520, and if not it asks the user to make a payment in step 8528. This payment may be made by magnetic credit card or smart card in a known manner or any other means such as a coin machine, bank note machine or by displaying the number of telephone communication units that will be invoiced to the user's line, and acceptance of the invoice. Once this payment has been made and verified, the program goes on to the save step in the file 841 containing the list of special requests to the disc-jockey (DJSRL). This file 841 is located either in the jukebox if the selection and special request are made locally on the same jukebox installed in the bar, or in the file 141 on the server if the selection is to be made on another jukebox. The jukebox 10 also comprises a program that can detect special requests made to another jukebox installed in another location and can write this request into the file 141 on the server by transmission through the network 200 to the server 100, such that when the server executes its periodic loading routine to the various jukeboxes, it also downloads the specific requests concerning each jukebox. In order to do this, when the server receives this type of special request from a jukebox on the network, it will examine this request by comparing the address of the jukebox contained in the request with the addresses contained in its database and thus determine the identity of the jukebox to which it must address the special request. This special request will be routed to the destination jukebox when periodic updates are being made or during periodic communications.

Obviously, for communications between the jukebox and the server or an Internet terminal and the server, information is compressed and encoded to enable confidentiality, whereas voice messages may be recorded in plain text not necessarily requiring encoding, but will be compressed for storage purposes to reduce the necessary storage area on the jukebox.

Thus, according to the invention, the selection process comprises a step in which a menu 8520, 8521 is displayed and a selection is made in it to make special requests, and other functions;

a step displaying the event 8525*a* for which the advance order of a selection is made, followed by selection of the event;

a step 8522 displaying the identity of a destination equipment on which the selection is to be played, followed by selection of this equipment;

a step 8523 displaying the date and time at which the selection is to be made on the destination equipment;

a step 8529 for recording or downloading to a special requests file only after payment has been confirmed.

According to another characteristic of the invention, it includes a step 8526 for selecting or recording a special message.

According to another characteristic, the invention comprises a step 8526*b* for recording messages consisting of recording a personal message.

According to another characteristic, the invention comprises a step 8526*a* in which a message is selected consisting of choosing one among several messages.

According to another characteristic, the invention comprises a step in which all jukeboxes make a connection to Internet and call the server site 100.

According to another characteristic, the display steps are made by sending Internet messages to the terminal 600 in order to display the selection steps necessary for selection steps, these selection or determination steps being made by messages sent from the terminal 600 to the server 100 as a function of actions performed by the user on his terminal to define his selection in advance.

The invention comprises a step in which the messages and requests are recorded on a file 141 on the host server 100 with the address of the destination equipment 10 and are then downloaded onto it at a given moment on the displays done.

The invention comprises a step to examine a special file 841 on each equipment 10 containing the recorded requests, to determine if the current date and time on the equipment 10 correspond to the required date and time for execution of the advance request.

Similarly, the jukebox 10 or server 100 comprise means of displaying information on a screen close to the user to guide him in the choice of special requests;

means of recording these requests in a special file 841, 141;

means of periodically examining the file 841, 141 recorded on the equipment to trigger execution of the request at the given time and date, or to trigger downloading of this request.

The invention comprises means of remotely transmitting these requests to the destination equipment.

According to the invention, the display means are composed of object modules added in *. DJO files called according to needs by the jukebox configuration file.

The files 840, 841 will be saved in the FILO. DJL module and program modifications necessary for operation and embodiment of this process will be downloaded in the different modules, in accordance with the downloading process defined in patent application 98 09358.

The device also comprises a means of defining rules for execution of the songs queue and thus modifying the behavior of the disc-jockey according to one of the following criteria; first in first out (FIFO) in the queue, at random and selecting the most popular songs first, eliminating the second consecutive song by the same artist or based on a combination of the previous rules or any other rule.

The remote distribution network comprises firstly a host server connected to the Internet network, and secondly through a second network, to a set of jukeboxes each identifiable by an identity number or an address in order to load each special request on the destination jukebox and means of scanning the file containing the special requests on each jukebox to have them executed when the local time and the day correspond to the selected time and day.

It will be obvious to persons familiar with the subject that many different embodiments would be possible within the framework of this invention as claimed. Consequently, the embodiments described herein must be considered as illustrations and can be modified within the field defined by the attached claims, and the invention cannot be restricted to the details described above.

What is claimed is:

1. A method for ordering, from a user's terminal connected to a host server via a communication network, a selection playable on destination equipment connectable to the host server via the communication network, the method comprising:

displaying, on the user's terminal, a list of selectable items that are playable on the destination equipment;

enabling a user to select, via the user's terminal and from the list, an item to be played on the destination equipment, as well as a time at which the selection is to be played;

displaying, for the user on the user's terminal, the destination equipment, the selection, and the time at which the selection is to be played;

receiving, at the user terminal, the selection and the time at which the selection is to be played;

transmitting, from the user's terminal to the server, information specifying the destination equipment, the selection, and the time at which the selection is to be played to cause the information specifying the destination equipment, the selection, and the time at which the selection is to be played to be transferred to the destination equipment;

wherein the destination equipment is different than the user's terminal.

2. The method of claim 1, wherein the information is saved to a file on the server, and the file is subsequently transmitted from the server to the destination equipment.

3. The method of claim 1, further comprising enabling the user to specify an event for which the selection is being made.

4. The method of claim 1, further comprising enabling the user to choose or save a message.

5. The method of claim 4, further comprising transmitting the message to the server.

6. The method of claim 4, wherein the message is selectable from a plurality of predefined messages.

7. The method of claim 4, further comprising saving, to the server, the message and an address of the destination equipment.

8. The method of claim 1, further comprising further comprising verifying receipt of payment to authorize generation and transmission of the information specifying the destination equipment, the selection, and the time at which the selection is to be played.

9. A method of operating a jukebox system including an electronic device connected to a host server via a communication network, the method comprising:

displaying, on the device, a user interface configured to enable a user to order, in advance, a selection to be played on at least one destination device connectable via the communication network to the host server, wherein each said destination device and said server each comprise a respective request processing module, the user interface being further configured to display a menu enabling the user to specify a selection to be played, and a future time and date at which the selection is to be played;

receiving, via the user interface, at least one specific request concerning a selection to be played, a future time and date at which the selection is to be played, and a selection of at least one destination device;

displaying, via the user interface, an indication of each said destination device on which the selection is to be played, the selection to be played, the date and time at which the selection is to be played, and an event for which the order of a selection is made in advance; and in response to the electronic device receiving information that payment has been made and verified, generating via at least one processor of the electronic device a file listing the specific request concerning the selection to be played and transferring said file to the server;

wherein the file is downloadable to each said specified destination device on which the selection is to be played; and wherein at least one of the specified destination devices on which the selection is to be played is not the user terminal.

10. The method of claim 9, wherein the user interface is programmed to enable the user to specify a message for later display.

11. The method of claim 10, wherein the message is included in the file.

12. The method of claim 10, wherein the user interface is programmed to enable the user to specify a message for later display select a predefined message and to specify a custom message.

13. The method of claim 9, wherein the user interface operates under the control of the server over the communication network.

14. The method of claim 10, wherein the message is displayable on the specified destination device.

15. The method of claim 9, wherein the specified destination device is programmed to determine whether a current date and time thereon matches the date and time specified in the file.

16. The method of claim 15, wherein the specified destination device is further programmed to cause the selection to be played in the event that there is a match between the current date and time thereon and the date and time specified in the file.

17. The method of claim 9, wherein the file is recorded directly on the destination device when the electronic device is the destination device on which the selection is to be played.

18. The method of claim 9, wherein the file is not a part of the selection to be played.

19. The method of claim 9, wherein the specific requests listed in the file specify at least one or more selections to be played, along with corresponding future time(s) and date(s) at which the one or more selections is/are to be played.

* * * * *